United States Patent

Mathews

[15] 3,671,829
[45] June 20, 1972

[54] MOVING COIL DIRECT RECIPROCATING MOTOR

[72] Inventor: Joseph W. Mathews, 3752 Swansea Dr., Mobile, Ala. 36609

[22] Filed: July 9, 1970

[21] Appl. No.: 53,510

Related U.S. Application Data

[63] Continuation-in-part of Ser. No. 858,942, Sept. 18, 1969, Pat. No. 3,575,649, which is a continuation-in-part of Ser. No. 542,116, April 12, 1966, Pat. No. 3,469,163.

[52] U.S. Cl............................................318/128, 310/27
[51] Int. Cl........................................................H02k 33/02
[58] Field of Search...............................318/119–134, 331; 310/13, 27

[56] References Cited

UNITED STATES PATENTS

| 2,297,084 | 9/1942 | Swallow | 310/27 X |
| 2,776,560 | 1/1957 | Erath et al. | 310/27 X |

*Primary Examiner*—D. F. Duggan
*Attorney*—Giles C. Clegg, Jr.

[57] ABSTRACT

A direct current reciprocating motor having a coil moving in a magnetic field and a circuit for controlling the flow of current through the coil from a d.c. source in accordance with an alternating flux produced by reversal of direction of current flow through the coil to produce reciprocating movement of the coil. A capacitor whose state of charge varies as a function of the back EMF generated by the coil is connected for controlling the conductivity state of at least one of the transistors as a function of the capacitor's state of charge.

12 Claims, 18 Drawing Figures

INVENTOR
Joseph W. Mathews

BY

ATTORNEY

INVENTOR
JOSEPH W. MATHEWS

ATTORNEY

INVENTOR
JOSEPH W. MATHEWS

ATTORNEY

MOVING COIL DIRECT RECIPROCATING MOTOR

CROSS REFERENCE TO RELATED APPLICATIONS

This application is a continuation-in-part of my co-pending application Ser. No. 858,942, filed Sept. 18, 1969, now U.S. Pat. No. 3,575,649 which is a continuation-in-part of application Ser. No. 542,116, filed Apr. 12, 1966, now U.S. Pat. No. 3,469,163.

BACKGROUND OF THE INVENTION

The present invention relates to direct current motors and more particularly to an improved direct current motor which utilizes electro-magnetic forces to produce reciprocating motion of a force transmitting member.

The present invention provides a brushless motor that is capable of converting low voltage direct current energy into reciprocating mechanical energy at a relatively high efficiency. In accordance with the principles of the present invention, there is provided a permanent magnet having an air gap that receives a coil. The coil is supported for oscillatory movement relative to the permanent magnet. Either the coil or magnet can be supported by the frame of the motor with the other moving relative thereto, although considerations including the relative mass of the coil and magnet renders it desirable that the coil be supported for oscillatory movement relative to the permanent magnet.

There is also included a control circuit for applying direct current to the coil with the current flowing in directions to produce magnetic flux that interacts with the magnetic flux associated with the permanent magnet to produce forces to produce rectilinear movement of the coil relative to the air gap. There is also included means for controlling the excursion of the coil and which preferably tends to return the coil in the opposite direction.

In accordance with the preferred embodiment of the invention, the coil is of cylindrical configuration. The coil is supported such that it is free to move axially in the air gap and any movement normal to its axis is restricted in order that the length of the air gap may be minimal yet permit acceptance of the coil. Further, in accordance with the preferred embodiment of the invention, a transistor which is controlled responsive to the back EMF (electromotive force) generated in the coil is utilized for selectively applying pulses of direct current to the coil to produce motion in one direction. A second transistor applies alternate pulses of direct current to the coil to produce motion in the opposite direction. The second transistor may be responsive to the back EMF generated in the coil.

Many objects and advantages of the invention will become readily apparent to those skilled in the art as the following detailed description of a preferred embodiment of the same unfolds when taken in conjunction with the appended drawings wherein like reference numerals denote like parts and in which.

Turning now to the drawings, a motor in accordance with one embodiment of the invention is designated generally by the reference numeral 10. It includes a magnetic structure 12 and a coil 14. Two rod members 16 and 18 depend from the lower surface 20 of the magnetic structure 12 and support plate members 22 and 24. The electrical components utilized in the control circuitry are suitably mounted on the plate member 22, but are not shown in FIG. 1 of the drawings, as to do so would unduly complicate the drawings. A pair of batteries 26 and 28 are mounted to the plate member 24 by bracket assemblies 30 and 32, respectively. Batteries 26 and 28 are preferably of the nickel cadmium type in order that they may be recharged and suitably are connected in series such that the voltage available to drive the motor is approximately 2.5 volts. It will be appreciated that as many batteries as are required to obtain a desired voltage level can be provided and that voltages greater than 2.5V can be used.

Figure 1:
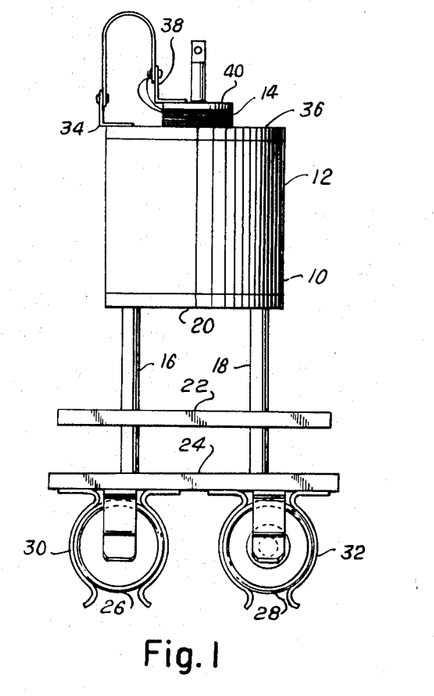
FIG. 1 is a side elevation view of one embodiment of the present invention.

An L-shaped member 34 is mounted to the upper surface 36 of magnetic structure 12 and, similarly, an L-shaped bracket member 38 is mounted to the upper surface 40 of coil 14. Extending between bracket member 34 and bracket member 38 is a pair of resilient conductor members 42 and 44, suitably formed of beryllium copper. Bracket members 34 and 38 are suitably formed of an insulating material at the points of contact with the members 42 and 44. Electrical conductors (not shown) extend from the bracket member 34 to the electrical control circuitry mounted on the plate 22, one of the electrical conductors contacting each of the members 42 and 44, respectively. One end of coil 14 is connected to the member 42, the other end being connected to member 44. Electrical connection is, therefore, provided between the coil 14 and electrical control circuitry.

Figure 2:
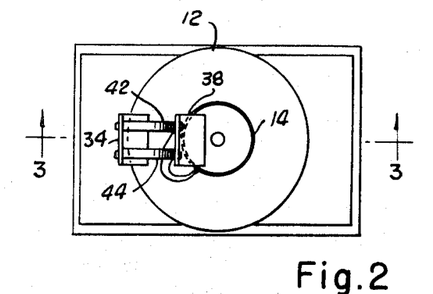
FIG. 2 is a plan view further illustrating the motor of FIG. 1.
Figure 3:
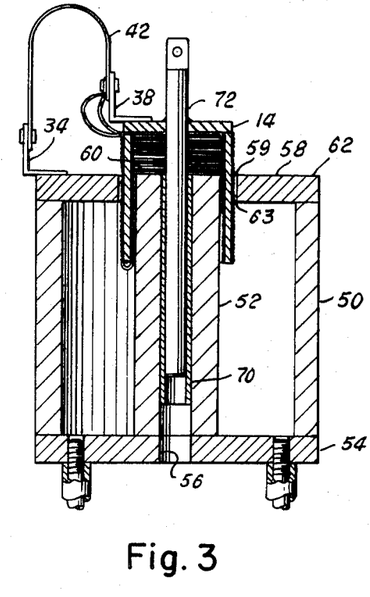
FIG. 3 is a cross sectional view taken along line 3—3 of FIG. 2.
Figure 4:
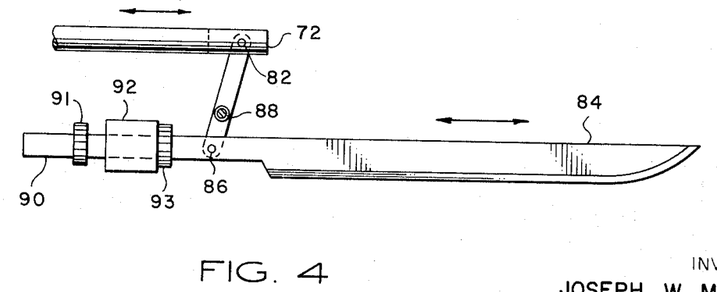
FIG. 4 is a view illustrating the manner in which the motor of the present invention can be utilized to drive a working element through a lever arrangement.

As best shown in FIG. 3, the magnetic structure 12 suitably comprises a first cylindrical member 50 and a second cylindrical member 52 whose outside diameter is substantially smaller than the inside diameter of the cylindrical member 50. There is also provided a first annular member 54 whose outside diameter is substantially the same as the outside diameter of the cylindrical member 50 and whose walls are substantially the same thickness. Annular member 54 includes an annulus 56 of substantially the same diameter as the inside diameter of the cylindrical 52. Cylindrical members 50 and 52 are mounted onto the annular member 54 such that the opening of the cylindrical member 52 is aligned with the annulus 56 of annular member 54, with cylindrical member 50 concentrically surrounding the cylindrical member 52. There is also provided a second annular member 58 having an outside diameter of substantially the same as the outside diameter of the cylindrical member 50. The annular member 58 includes an annulus 59 of slightly greater diameter than the outside diameter of cylindrical member 52 and of a thickness substantially the same as the thickness of cylindrical member 50. The cylindrical member 52 is suitably of greater length than cylindrical member 50 by an amount equal to the thickness of annular member 58 such that when the elements of the magnetic structure 12 are arranged as shown in FIGS. 1–3, the upper end 60 of cylindrical member 52 will lie in substantially the same plane as the upper edge 62 of the annular member 58. The diameter of the annulus 59 is greater than the outside diameter of cylindrical member 52 by an amount equal to twice the desired width of the air gap 63 in which the coil 14 moves. The elements of the magnetic structure 12 are all preferably of a permanent magnetic material or a material having a high permeability, such as soft iron. Generally, it is preferred that the element 50 be of permanent magnetic material and the elements 52, 54 and 58 be of soft iron when minimum piston size and weight, low vibration, high speed and low work are required. If greater work is required, it is preferred that the part 52 be of permanent magnetic material for a given air gap and weight of magnetic material. A bearing 70 is positioned within the cylindrical member 52 for receiving a shaft 72. As best shown in FIG. 4, the windings 74 of the coil 14 are wound on a cylindrical coil form 76. Coil 14 is mounted onto the shaft 72 with shaft 72 being coaxial with coil 14. When shaft 72 is inserted into bearing 70, at least a portion of the coil form 76 will extend into the air gap 63. As current is caused to flow through the winding 74 of the coil to produce a magnetic field that interacts with the magnetic field within the air gap of the permanent magnet, the coil will move into the air gap, carrying shaft 72 with it. The direction of movement is, of course, determined by the direction of current flow for a given magnetic polarity.

As the coil moves in the air gap with the motor running, it will reach a point of desired maximum excursion and must be returned to the opposite point of maximum excursion. It is practical to reverse the direction of current flow to permit flow of current in a direction to produce the flux that interacts with the lines of force of the permanent magnet to result in the coil being returned to its initial position.

By generating alternating magnetic fields of opposite polarity as a result of reversing the direction of current flow in the coil, rectilinear movement of the coil relative to the magnetic structure is produced.

The mechanical energy available as the shaft 72 moves can be used in many applications. Many applications require circular motion and the reciprocating, rectilinear motion of the shaft 72 can suitably be converted to a circular motion by coupling the shaft 72 to a cranking member of conventional type. It will be noted that a crank member can provide the function of limiting the maximum excursion of the coil.

Reciprocating motion can be obtained by coupling to the shaft 72 either directly or through a suitable lever arrangement. For example, as shown in FIG. 4, the shaft 72 can be coupled to a knife blade 84 at point 86. Lever member 80 is suitably pivotally mounted about a centrally disposed point 88 such that movement of the coil away from the permanent magnet will cause the knife blade 84 to move in an opposite direction. The end 90 of knife blade 84 is suitably elongated and passes through a bearing member 92 which cooperates with lever member 80 to maintain alignment of the knife blade 84. Operation of the motor will, therefore, be effective to produce reciprocating motion of the knife blade 84, as would be suitable for cutting. Rings 91 and 93 can be provided for limiting the movement of the blade 84.

The preferred motor structure, as shown in FIGS. 5, 6, 7, and 8 of the drawings, can be seen to be substantially similar to the motor structure shown in FIGS. 1-3 of the drawings. The structure includes a magnetic structure 112 and coil 114. The bracket assembly 116 comprises a cross member 116 and two post member 118 and 120. The cross member 116 is spaced apart from the upper surface 122 of the magnetic structure 112, providing space in which the coil moves in and out of an air gap 124 provided by the magnetic structure. A spring 126 is carried by the assembly 116 with an impact plate 128 mounted on the free end of the spring. The spring can be supported by a plug 117 held in position by a set screw 119, permitting axial movement of the plate 128 relative to shaft 130 for varying the stroke of the shaft. Shaft 130 passes co-axially through the spring 126 and the plate 128 and may also extend through the cross member 116.

Figure 8:
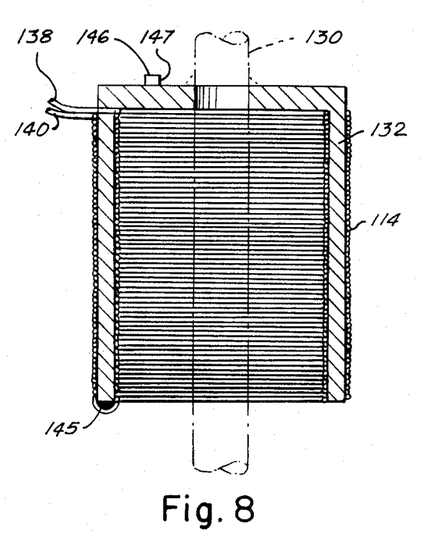
FIG. 8 is a view similar to FIG. 3 but illustrating a coil in accordance with the preferred embodiment of the invention and in enlarged form.

A coil form 132 on which the coil 114 is wound is carried by the shaft 130. The coil form 132 is suitably placed directly below an impact member 134 which is carried by the shaft 130 in opposing relationship to the impact member 128. Still another impact member 136 is carried by the shaft 130, with the impact member 136 suitably being affixed to the shaft immediately below the coil form 132. In accordance with the preferred embodiment of the invention, the coil 114 wound onto the coil form 132 comprises two windings which are wound with one winding in opposition to the other. The ends of the coil are connected through leads 138 and 140 to contact pads 142 and 144 affixed to the post members 118 and 120 respectively. Lead 146 extends from the center tap of the coil to another contact pad, not shown. The coil can comprise two layers wound on the outside of the coil form, or, as shown in FIG. 8, one layer of the coil can be wound on the inside of the coil form and the second layer wound on the outside. The coil form itself is preferably of brass shimstock. It can be of other suitable material, such as ferrous material or in some instances paper coil forms are suitable if the power required from the motor is small. If the coil form is of conductive matieral as shown in FIG. 8, a convenient manner to bring the center tap lead out is to electrically connect the center tap of the coil to the coil form for soldering at 145 with the remaining windings of the coil being insulated from the coil form. In such instance, it is practical then to connect the lead 146 electrically and mechanically to the coil form at 147 with the coil form providing electrical connection to the center of the winding.

Figure 5:
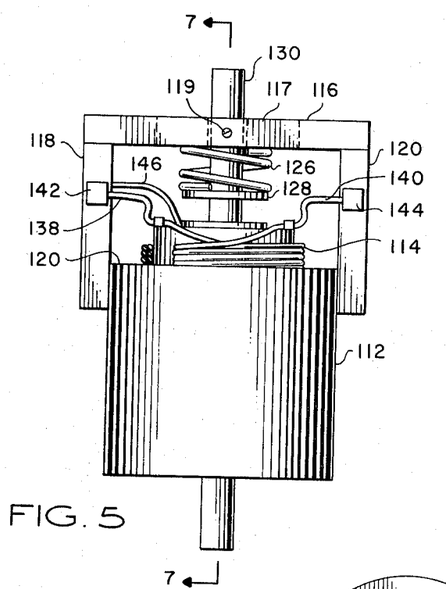
FIG. 5 is a view similar to FIG. 1 illustrating a preferred embodiment of the invention.
Figure 6:
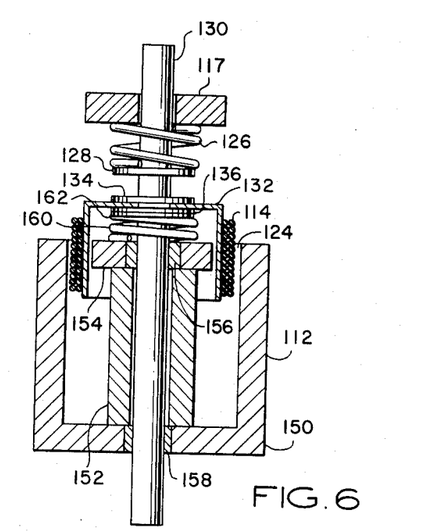
FIG. 6 is a plan view further illustrating the motor of FIG. 5.
Figure 7:
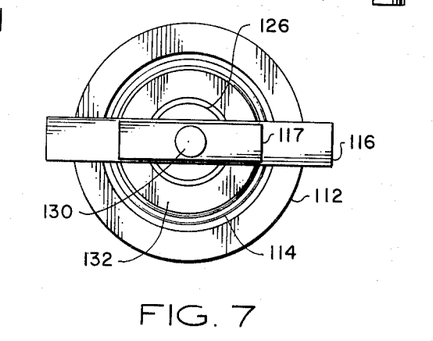
FIG. 7 is a cross sectional view taken along line 7—7 of FIG. 6.

The magnetic structure itself can be as shown in FIGS. 1, 2 and 3 of the drawings. However, a more preferred magnetic structure is as shown in FIGS. 5, 6 and 7 of the drawings wherein the magnetic structure 112 includes a cup member 150 of a ferrous material and a tubular member 152 of a permanent magnet material. Affixed to the top of the permanent magnet 152 is a coaxial annular disk 154 which is also of ferrous material with the outside diameter of the disk 154 being less than the inside diameter of the cup member 150 by an amount equal to twice the desired air gap. Bearing 156 is preferably provided in the member 154 and a second bearing 158 is preferably provided in the base of the cup member 150. The bearings 156 and 158 support the shaft 130 for reciprocating movement, with the bore of the tubular member 150 suitably being slightly greater than the diameter of the shaft 130. A second spring 160 is preferably mounted on the outside surface of the disk member 154 and enclosed by the coil form 132. An impact member 162 is carried by the coil spring 160 in opposing relationship to the impact member 136. The forces required to significantly compress the springs are preferably large compared to the force produced by the pistons so that the stroke length is essentially the free travel distance of the piston between springs. The excursion of the coil in the air gap is thereby limited by the springs 126 and 160 rather than by rings 91 and 93.

In accordance with the present invention, when direct current supply voltage is initially applied to the coil, the control circuit permits current flow in a direction to drive the shaft and the coil relative to the magnetic structure until movement of the coil stops. The back EMF generated in the coil is used to control the control circuit such that when the movement of the coil stops, the direction of current flow in the coil will be reversed causing the coil to be driven in the opposite direction to the limit of its excursion. When movement of the coil stops, the back EMF generated in the coil is again used to cause the direction of current flow in the coil to be reversed, driving the coil in the original direction.

The response of the spring when loaded by the mass of the piston is preferably faster than the piston response when driven by the electromagnetic means. Part of the energy of piston motion (one-half $mv^2$) will then be conserved and the spring will be effective in accelerating the piston in the opposite direction along with the electromagnetic means.

Figure 9:
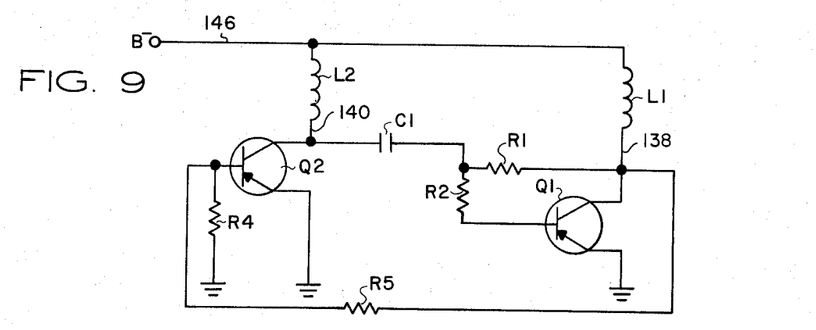
FIG. 9 is a schematic diagram illustrating one control circuit for use in practicing the present invention.

An exemplary control circuit for accomplishing the above function is shown in FIG. 9 of the drawings. It can be seen to include a transistor 21 whose collector is connected to lead 138 of the coil 114. Lead 146 of the coil 114 is connected to a source of negative voltage B—. The emitter of transistor $Q_1$ is connected to ground. Similarly, lead 140 of the coil 114 is connected to the collector of the transistor $Q_2$ whose emitter is connected to ground. One winding $L_1$ of the coil 114 is thereby connected from B− to ground through one transistor and a second winding $L_2$ of the coil is connected through the collector emitter circuit of transistor $Q_2$ to ground. Since the two windings are wound in opposition, when transistor $Q_1$ is conductive, current will flow through the coil 114 in one direction to cause the coil to be driven relative to the magnetic structure but when transistor $Q_2$ is conductive, current will flow through the coil in an opposite direction to cause the coil to be driven in the opposite direction. Accordingly, by controlling the conductivity state of the transistors $Q_1$ and $Q_2$ an effective reversal of the direction of current flow through the coil is obtained. The control circuit shown in Fig. 9 also includes a capacitor $C_1$ which is connected from the collector of transistor $Q_2$ through a resistor $R_1$ to the collector of transistor $Q_1$. A resistor $R_2$ is connected from the base of transistor $Q_1$ to the juncture between capacitor $C_1$ and resistor $R_1$. The base of transistor $Q_2$ is connected to ground through resistor $R_4$ and through resistor $R_5$ to the collector of transistor $Q_1$.

Figure 11:
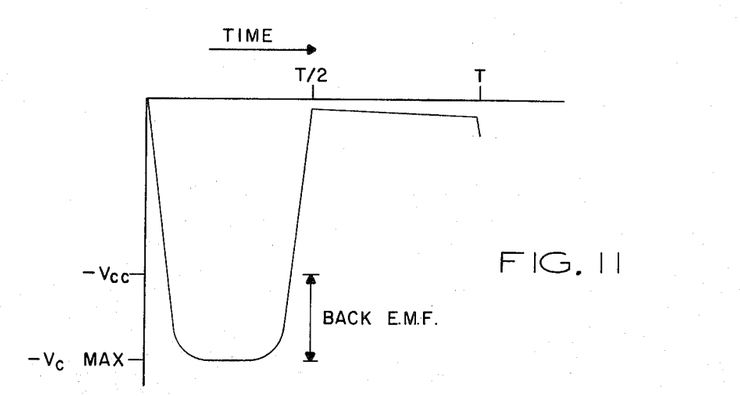
FIGS. 11, 12 and 13 are curves illustrating various wave forms present in the control circuitry of FIG. 9 or FIG. 10.
Figure 12:
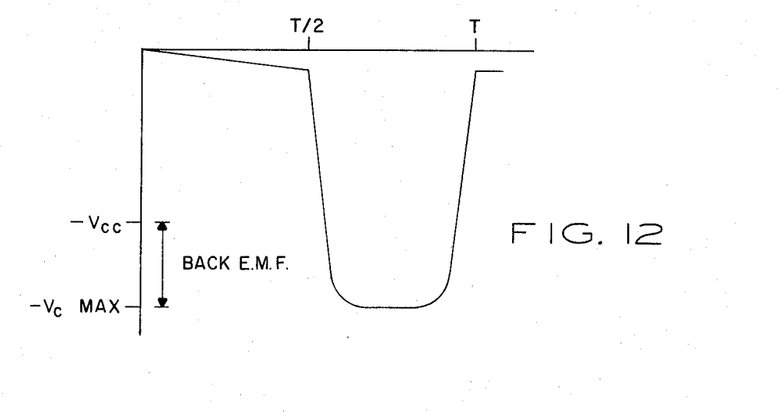
Figure 13:
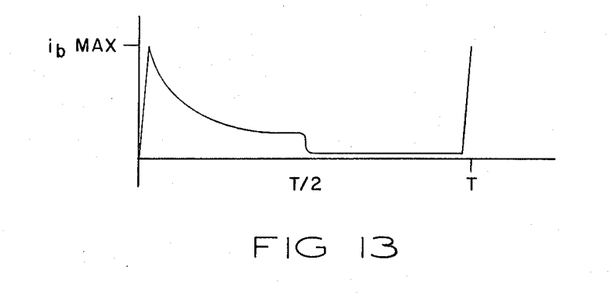

Referring to FIGS. 11, 12 and 13, FIG. 11 is a curve showing the wave form appearing at the collector of transistor $Q_1$. FIG. 12 shows the potential appearing at the collector of transistor $Q_2$ and FIG. 13 shows the base current applied to the base of transistor $Q_1$. As can be seen by reference to FIGS. 11 and 12, a substantial portion of the potential appearing at the collector-electrode of transistors $Q_1$ and $Q_2$ results from the back EMF produced in the windings $L_1$ and $L_2$.

In order for satisfactory wide speed range of the motor to be obtained, it is desirable that the saturation period for transistor $Q_1$ when the shaft is locked be longer than the period of a full stroke in one direction under the largest load of interest. Similarly, the discharge time of the capacitor when the shaft is locked should be at least equal to or preferably somewhat longer than the saturation period of transistor $Q_1$.

When power is initially applied to the motor, the capacitor $C_1$ will be in discharged state. As power is applied, it will commence to charge with the major portion of the charging current flowing through the base emitter circuit of transistor $Q_1$ biasing $Q_1$ on, and preferably into saturation. As the drop across the collector emitter circuit of transistor $Q_1$ is very small, transistor $Q_2$ will be biased off. Current will, accordingly, flow through winding $L_1$ of the coil in a direction to cause the coil to move into the magnetic structure.

After initial motion into the magnetic structure, the impact plate 136 will come into contact with the impact plate 162 and the spring 160 will be compressed. As a result of the force exerted by the spring by the spring 160, the speed at which the coil is moving will decrease. The decrease in the speed of the coil will result in a decrease of back EMF being generated in the winding $L_1$ and an increase of current which will cause the potential at the collector electrode of transistor $Q_1$ to increase. Also, as a result of charging of the capacitor $C_1$, the base current flowing to bias the transistor $Q_1$ will have decreased causing the transistor to become unsaturated and further increasing the potential appearing at the collector of transistor $Q_1$. As a result of the increase in potential appearing at the collector of transistor $Q_1$, the transistor $Q_2$ will be biased on. As transistor $Q_2$ is biased on, its collector potential will drop reducing the potential to which the capacitor $C_1$ can charge, further reducing the base current applied to transistor $Q_1$. This degenerative process will continue until transistor $Q_2$ will be biased on, and preferably in saturation, and transistor $Q_1$ will essentially be biased off.

The collector potential of transistor $Q_2$ will fall to a very low value and the capacitor $C_1$ will discharge with the principal discharge path being through the resistor $R_1$ and the two windings $L_1$ and $L_2$. Since transistor $Q_2$ is biased on and transistor $Q_1$ is biased off, the direction of current flow through the coil 114 is reversed with current flowing only through the winding $L_2$. Since the windings $L_1$ and $L_2$ are wound oppositely, the flow of current will be effective to reverse movement of the coil. Movement of the coil in the second direction will continue until the impact plate 134 contacts impact plate 128 and commences to compress the spring 126. As spring 126 is compressed, the speed of movement of the coil will decrease causing the potential at the collector of transistor $Q_2$ to increase as a result of the decreased back EMF generated in the winding $L_2$. As the potential of the collector of transistor $Q_2$ increases, the capacitor $C_1$ will commence to charge supplying base current to transistor $Q_1$. Once base current is supplied to transistor $Q_1$, its collector potential will decrease, decreasing the base bias applied to transistor $Q_2$ and causing a further increase in the potential of its collector. This degenerative process then continues until transistor $Q_1$ is biased full on and transistor $Q_2$ is biased full off, resulting in flow of current through the winding $L_1$ in a direction to again reverse direction of coil travel.

During starting, transistor $Q_1$ will stay in saturation something less than the relaxation mode period of time on the first $Q_1$ drive pulse. However, on the following discharge portion of the cycle, less charge would be removed from capacitor $C_1$ since the duration and degree of conduction is influenced by the back EMF appearing at the collector of transistor $Q_1$. Since transistor $Q_2$ conducts harder in the presence of back EMF, it becomes less conductive as the back EMF is reduced when the piston reaches the spring, permitting the capacitor to begin to recharge with resultant switching of conductivity states of transistors $Q_1$ and $Q_2$. On the second pulse to transistor $Q_1$, it will again saturate but will have reduced base current over the previous cycle because of the higher residual charge on capacitor $C_1$. When transistor $Q_1$ comes out of saturation another discharge cycle occurs and an even greater residual voltage remains on capacitor $C_1$ with the result that transistor $Q_1$ remains saturated for even a shorter period of time on successive pulses. This acceleration process continues for whatever number of cycles is necessary for the piston to reach its maximum speed for the load condition, supply voltage, and motor constants. Deceleration results in a similar action but with increasing swings in capacitor voltage and decreased residual capacitor voltage.

The motor operates at essentially constant stroke over a wide range of load and then as the load is increased, continues at a short stroke but increased repetition rate over another wide load range and is thus stall resistant. It is important to note that in one winding is provided with more turns than the other, the motor will operate at lower speed when under drive with winding with the most turns. The motor will accordingly operate at a higher speed in one direction than the other. Such a motor may be desirable where work is done with one stroke with the other being merely a return stroke. Power driven saws and hammers are exemplary of apparatus which would use such a motor.

Figure 10:
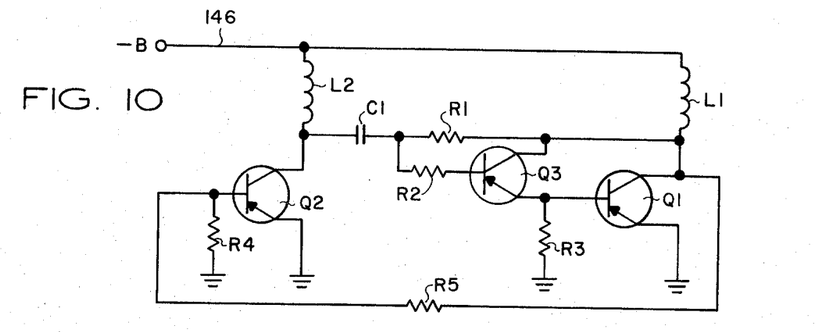
FIG. 10 is a schematic diagram illustrating still another control circuit suitable for use in practicing the present invention.

It can readily be seen from the foregoing that the flow of current through the windings of the coil is controlled by the back EMF generated in the coil and the charging of capacitor $C_1$. Moreover, it is desirable, for most efficient operation, that the charging current provided by capacitor $C_1$ be sufficient to drive the transistor $Q_1$ into saturation. In many practical applications, the normal charging current of capacitor $C_1$ will not be sufficient for this purpose and, accordingly, becomes desirable to provide a current amplification, suitably as shown in FIG. 10. Thus, in FIG. 10 an additional transistor $Q_3$ has its collector connected to the collector of transistor $Q_1$ with its emitter being connected to the base of transistor $Q_1$. The base of transistor $Q_3$ is connected to resistor $R_2$ with the base of transistor $Q_1$ being connected to resistor $R_2$ through the emitter base circuit of transistor $Q_3$. Accordingly, the current flowing to charge capacitor $C_1$ will be current amplified by transistor $Q_3$ reducing the amount of charge current required to drive the transistor $Q_1$ into saturation.

Figure 14:
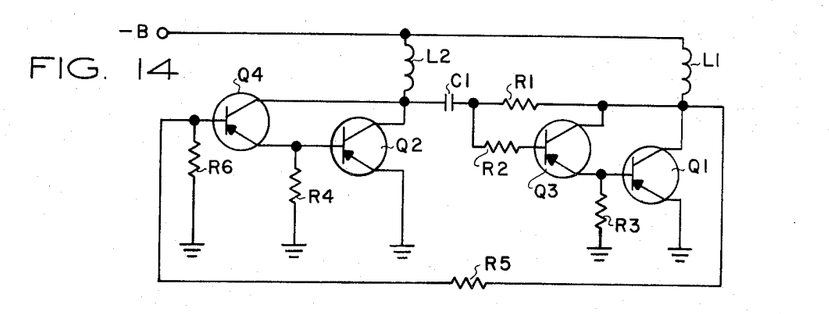
FIG. 14 is a schematic diagram illustrating another control circuit.

Operation of the circuits shown in FIGS. 9 and 10 is substantially the same as the control circuit shown in U.S. Pat. No. 3,469,163. However, when the piston is driven in only one direction by current flowing through the coil, it is not necessary or desirable that the transistor $Q_2$ become saturated whereas in the present invention it is desirable that the transistor $Q_2$ be driven into saturation in order that maximum power will be applied to the winding $L_2$. It is, therefore, desirable when maximum efficiency is required that a fourth transistor $Q_4$ be provided which amplifies the signal applied to the base of transistor $Q_2$. It is practical to connect the collector of transistor $Q_1$ through resistor $R_5$ to the base of the transistor $Q_4$ with the emitter of transistor $Q_4$ being connected to the base of transistor $Q_2$ as shown in FIG. 14. Biasing resistor $R_6$ is connected between the base of transistor $Q_4$ in ground with the collector of transistor $Q_4$ being connected to the collector of transistor $Q_2$. The amplification provided by transistor $Q_4$ will insure that transistor $Q_2$ is driven into saturation, providing maximum current flow through the winding $L_2$, resulting in more symmetrical operation.

Figure 15:
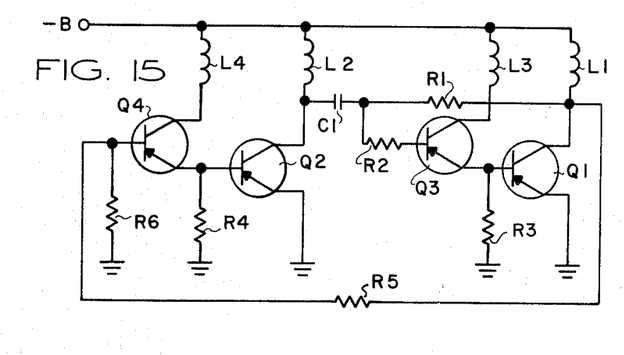
FIG. 15 is a schematic diagram illustrating still another control circuit.

Higher power at fixed supply voltage can be obtained by providing an additional winding $L_3$ which is connected between the collector of transistor $Q_3$ and the source of supply voltage and 9 winding $L_4$ which is wound to be of the same polarity as the winding $L_2$ but which is connected between the source supply voltage and ground through transistor $Q_4$ as shown in FIG. 15. Since the conductivity states of transistors $Q_1$ and $Q_3$ are the same but opposite conductivity states of transistors $Q_2$ and $Q_4$, current will alternately flow through windings $L_1$ and $L_3$ and windings $L_2$ and $L_4$.

Figure 16:
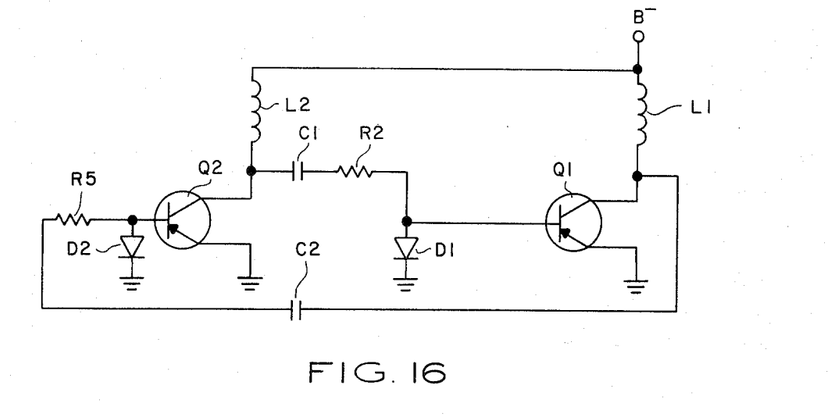
FIG. 16 is a schematic diagram of another control circuit suitable for use in practice in the invention.

FIG. 16 illustrates another embodiment of the control circuit in accordance with the present invention wherein the resistor $R_1$ is eliminated and resistor $R_3$ is replaced by diode $D_1$. Resistor $R_4$ is replaced by diode $D_2$ and resistor $R_5$ is connected to the collector of transistor $Q_1$ through a capacitor $C_2$. The circuit of FIG. 16 provides back bias on the base of the transistor when it is in the low conductivity state with the diodes providing discharge paths for the capacitors. Resistors $R_1$ and $R_7$, as shown in FIG. 9, are not required because of fundamental instability in the circuit. Again, the charge on the capacitors is controlled by the back EMF generated in the windings and the conductive durations and levels of the transistors and the charge on the capacitors varies with speed to permit acceleration or deceleration of the motor.

Figure 17:
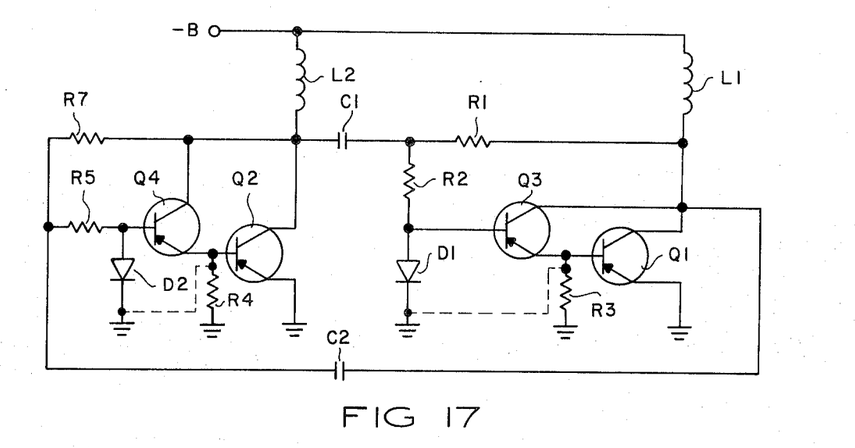
FIG. 17 illustrates a control circuit in accordance with still another embodiment of the invention.
Figure 18:
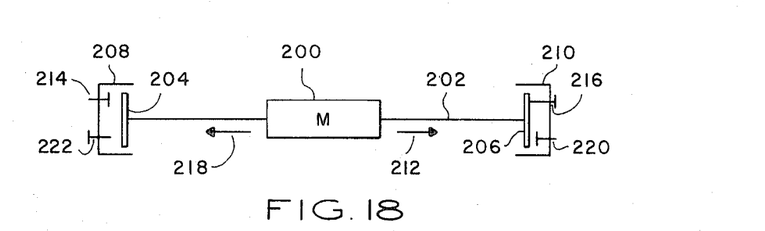
FIG. 18 diagrammatically illustrates the manner in which the motor of the present invention can be cooperatively coupled to a pump.

The control circuit of FIG. 17 is a modification of the circuit of FIG. 16 incorporating the starting resistors $R_1$ and $R_7$ and the additional driving transistors $Q_3$ and $Q_4$. However, as described previously with reference to FIG. 14, provision of the additional transistors $Q_3$ and $Q_4$ merely assures that the transistor being driven will be driven into saturation with minimum base drive flowing through the opposing winding. The additional capacitor insures that the transistor in the low conductivity state will be essentially cut off. The circuits as shown in FIGS. 16 and 17 are advantageous in that they are characterized by improved temperature stability and more symmetrical switching action. Connection of the discharge diodes to the resistors $R_3$ and $R_4$ of the drive transistors $Q_1$ and $Q_2$ as indicated by the dashed lines, rather than to ground, provides reverse bias to both transistors of the composite pair during off time.

In the motor structure shown in FIGS. 5, 6 and 7 of the drawings, there is provided two springs for limiting the excursion of the coil and the air gap and slowing the travel of the shaft and the coil towards the limits of excursion. In some applications provision of discreet springs is not necessary, however. For example, a motor generally of a configuration, for example, as shown in FIGS. 5 through 7, can have its shaft 202 connected at opposite ends to pistons 204 and 206 of a double acting pump including two cylinders 208 and 210. When the shaft 202 moves in the direction indicated by the arrow 212, fluid will be pulled into cylinder 208 through valve port 214 and fluid present in cylinder 210 will be expelled through valve port 216. Conversely, when the shaft 202 is driven in the direction indicated by arrow 218, fluid will be drawn into cylinder 210 through valve port 220 and expelled from cylinder 208 through valve port 222. If the pump is a diaphragm pump having a diaphragm of an elastomeric material, the diaphragm can supply the speed decreasing force and conservation of energy or, in some instances, the increased force required to pump the fluid as a result of increased pressures within the cylinders provides a similar function as that performed by the springs and, accordingly, in many such applications springs can be eliminated. The fluid being pumped thereby provides a compressible load for limiting the excursion shaft.

Although the invention has been described with reference to particular preferred embodiments thereof, many changes and modifications will become apparent to those skilled in the art in view of the foregoing description which is intended to be illustrative and not limiting of the invention defined in the appended claims.

What is claimed is:

1. A reciprocating d.c. motor comprising:
   a. an armature coil means including first and second oppositely wound windings;
   b. a magnetic structure having an air gap adapted to receive said coil;
   c. shaft means supporting said coil for rectilinear movement in said air gap;
   d. means connecting one end of each of said windings to one terminal means of a d.c. supply voltage means;
   e. a first transistor having emitter, base and collector electrodes;
   f. means connecting the opposite end of the first winding through the emitter-collector electrodes of the first transistor to a second terminal means of said supply voltage means;
   g. a second transistor having emitter, base and collector electrodes;
   h. means connecting the opposite end of the second winding through the emitter-collector electrodes of the second transistor to a second terminal of said supply voltage means;
   i. a first capacitor;
   j. means responsive to the potential appearing at one of the collector and emitter electrodes of the first transistor for controlling the conductivity state of the second transistor;
   k. means responsive to the potential appearing at one of the emitter and collector electrodes of the second transistor for controlling the charging and discharging of the first capacitor; and
   l. means responsive to the charging and discharging of the first capacitor for controlling the conductivity of the first transistor.

2. A reciprocating d.c. motor as defined in claim 1 wherein the control means includes a second capacitor and means responsive to the potential appearing at one of the emitter and collector electrodes of the first transistor for controlling the charging and discharging of the second capacitor and means for controlling the conductivity state of the second transistor responsive to the second capacitor being charged and discharged.

3. A reciprocating d.c. motor as defined in claim 1 further including means for limiting the excursion of said shaft in said air gap.

4. A reciprocating d.c. motor as defined in claim 3 wherein the means for limiting is a compressible load.

5. A reciprocating d.c. motor as defined in claim 4 wherein the compressible load means comprises a spring means.

6. A reciprocating d.c. motor as defined in claim 5 wherein said spring means is effective only toward the extremes of traverse of said shaft.

7. A reciprocating d.c. motor as defined in claim 6 wherein the spring means is carried by said magnetic structure and said shaft includes fixed impact means for engaging said spring means toward the end of traverse of said shaft.

8. A reciprocating d.c. motor as defined in claim 1 wherein one of said windings includes more turns than the other.

9. A reciprocating d.c. motor as defined in claim 1 including a third transistor for providing current amplification of the base current supplied to the first transistors as a result of charging of the first capacitor.

10. A reciprocating d.c. motor as defined in claim 1 including third and fourth transistors connecting for amplifying the signal applied to the base of the first and second transistors.

11. A reciprocating d.c. motor as defined in claim 10 including third and fourth windings of said coil connected in circuit with the emitter collector electrodes of the third and fourth transistors respectively, and said supply means.

12. A reciprocating d.c. motor as defined in claim 1 further including a second capacitor connected between the collector electrode of the first transistor and the base of the second transistor.

* * * * *

UNITED STATES PATENT OFFICE
CERTIFICATE OF CORRECTION

Patent No. 3,671,829    Dated June 20, 1972

Inventor(s) Joseph W. Mathews

It is certified that error appears in the above-identified patent and that said Letters Patent are hereby corrected as shown below:

Column 5, line 15, after "obtained," there should be a new paragraph; column 6, line 45, cancel "in" and insert -- if --; column 7, line 21, cancel "9" and insert an -- a --.

Signed and sealed this 19th day of December 1972.

(SEAL)
Attest:

EDWARD M. FLETCHER, JR.            ROBERT GOTTSCHALK
Attesting Officer                   Commissioner of Patents